US006437847B1

(12) United States Patent
Kishimoto

(10) Patent No.: US 6,437,847 B1
(45) Date of Patent: Aug. 20, 2002

(54) LCD WITH POLYMER SPACERS

(75) Inventor: Katsuhiko Kishimoto, Nara (JP)

(73) Assignee: Sharp Kabushiki Kaisha, Osaka (JP)

( * ) Notice: Subject to any disclaimer, the term of this patent is extended or adjusted under 35 U.S.C. 154(b) by 52 days.

(21) Appl. No.: 09/638,859

(22) Filed: Aug. 15, 2000

(30) Foreign Application Priority Data

Aug. 23, 1999 (JP) .......................... 11-235475
Jun. 15, 2000 (JP) .......................... 2000-180038

(51) Int. Cl.⁷ ............... G02F 1/1339; G02F 1/1335; G02F 1/1333
(52) U.S. Cl. ............... 349/155; 349/156; 349/157; 349/106; 349/110
(58) Field of Search ............... 349/155, 156, 349/157, 110, 111, 106

(56) References Cited

U.S. PATENT DOCUMENTS 5,815,232 A * 9/1998 Miyazaki et al. ........... 349/155

| 6,072,557 | A | 6/2000 | Kishimoto | 349/156 |
| 6,115,098 | A * | 9/2000 | Kume et al. | 349/156 |
| 6,266,122 | B1 | 7/2001 | Kishimoto et al. | 349/156 |
| 6,281,960 | B1 | 8/2001 | Kishimoto et al. | 349/156 |
| 6,330,049 | B1 | 12/2001 | Kume et al. | 349/156 |

FOREIGN PATENT DOCUMENTS

JP 10-10502 1/1998
JP 2000-19522 1/2000

* cited by examiner

Primary Examiner—William L. Sikes
Assistant Examiner—Tarifur R. Chowdhury
(74) Attorney, Agent, or Firm—Nixon & Vanderhye P.C.

(57) ABSTRACT

The liquid crystal display device comprises a pair of substrates 10, 20, and a liquid crystal layer 30 formed between said pair of substrates 10, 20, wherein one substrate 10 is equipped with a first polymer spacer 13 and 14, a second polymer spacer 16 formed to have overlapped areas over the first polymer spacer, and pillar-like protrusions 17 formed on said overlapped areas of the second polymer spacer 16.

13 Claims, 7 Drawing Sheets

LCD WITH POLYMER SPACERS

FIELD OF THE INVENTION

The present invention relates to a liquid crystal display device, and especially relates to a liquid crystal display device comprising liquid crystal regions divided by polymer walls and having axially symmetrically aligned liquid crystal molecules within said liquid crystal regions.

DESCRIPTION OF THE RELATED ART

Heretofore, a TN (twisted nematic)-type liquid crystal display or an STN (super twisted nematic)-type liquid crystal display utilizing nematic liquid crystal materials is known as a display device utilizing electrooptical effect.

In order to widen the viewing angle of the liquid crystal display, for example, Japanese Patent Application Laid-Open Publication Nos. 6-301015 and 7-120728 disclose a liquid crystal display having liquid crystal molecules axially symmetrically aligned within each of a plurality of liquid crystal regions divided by a polymer wall, or so-called ASM (axially symmetrically aligned microcell)-mode liquid crystal display device (prior art example 1). The liquid crystal regions each substantially surrounded by a polymer wall are typically formed corresponding to each pixel element. Since the liquid crystal molecules are axially symmetrically aligned in the ASM-mode liquid crystal display device, the viewer can observe the liquid crystal display device from any direction without the contrast being varied greatly, or in other words, the ASM-mode display device has a wide viewing angle characteristic.

The ASM-mode liquid crystal display device disclosed in the above publications is manufactured by providing polymerize-induction-phase-separation to the mixture including a polymerized material and a liquid crystal material.

The method for manufacturing the liquid crystal display device according to prior art example 1 is explained in detail with reference to FIG. 10. First, as shown in FIG. 10(*a*), a substrate is prepared having color filters and electrodes (not shown) formed on one surface of a glass substrate 11' (step a).

Next, as shown in FIG. 10(*b*), on the surface of the glass substrate 11' equipped with the electrodes and color filters, a polymer wall 13' for axially symmetrically aligning the liquid crystal molecules is formed, for example in a lattice-shape (step b). Actually, after spin-coating a photosensitive resin material on the surface of the glass substrate 11' equipped with the color filters and electrodes, the material is exposed through a photo-mask having a predetermined pattern and then developed, in order to form a lattice-shaped polymer wall 13'. The photosensitive material utilized in this step could either be negative or positive. According to another example, the polymer wall may also be formed using a resin material without photosensitivity. In that case, however, a step for forming a separate resist layer must be added to the process.

Next, as shown in FIG. 10(*c*), by exposing/developing the photosensitive resin material, pillar-like protrusions 17' are separately formed, through patterning, on some areas of the top of the polymer wall 13' selectively (step c).

Next, as shown in FIG. 10(*d*), the surface of the glass substrate equipped with the polymer wall 13' and the pillar-like protrusions 17' is covered with a vertical alignment film 18' made for example of polyimide (step d).

On the other hand, the surface of an opposing glass substrate 21' shown in FIG. 10(*e*) equippedwith electrodes (not shown) is covered with a vertical alignment film 28' (step f).

Next, as shown in FIG. 10(*g*), the two substrates 11' and 21' are bonded together with the surfaces equipped with electrodes facing each other, in order to form a liquid crystal cell (step g). The gap between the two substrates is defined by the sum of the heights of the polymer wall 13' and the pillar-like protrusion 17'. Therefore, the thickness of the liquid crystal layer (cell gap) could be adjusted to a preferred value.

Next, as shown in FIG. 10(*h*), liquid crystal material 32' is injected by a vacuum injection method and the like, to the liquid crystal region 31' formed within the liquid crystal cell (step h).

Lastly, as shown in FIG. 10(*i*), voltage is applied to the pair of electrodes arranged in opposed positions, in order to axially symmetrically align the liquid crystal molecules 32' within the liquid crystal region 31' (step i). The liquid crystal molecules within each of the liquid crystal regions divided by the polymer wall 13' are axially symmetrically aligned with a center axis 33' shown by a broken line that is perpendicular to the pair of substrates.

The cross-sectional structure of a conventional color filter 12' is shown in FIG. 11. The color filter 12' includes a black matrix (BM) 13' for blocking the gap formed between colored patterns, and a colored resin layer 14' colored to red, green and blue (R, G, B) corresponding to each pixel element, which are formed on the glass substrate 11'. An overcoat (OC) layer 19' formed of acrylic resin, epoxy resin and the like having a thickness of approximately 0.5–2.0 $\mu$m is formed on the colored resin layer, so as to improve the smoothness of the surface. On top of the overcoat layer is formed a transparent electrode 15' formed of indium tin oxide (ITO) film. The BM film 13' is typically formed of a metal chromium film having a thickness of approximately 100–150 nm. The colored resin layer 14' is formed by coloring a resin material with dyestuff or pigment, with a typical thickness of approximately 1–3 $\mu$m.

In order to form the color filter, a colored resin layer having photosensitivity formed on a substrate is patterned through photolithography method. For example, three photosensitive resin materials each colored to red (R), green (G) or blue (B) are utilized, and through coating/exposing/developing of each colored photosensitive resin material, a color filter having R, G, B colors is manufactured. The method for forming the photosensitive colored resin layer includes applying the liquid-state photosensitive colored resin material diluted by a solvent onto the substrate by a spin-coating method and the like, or transferring the photosensitive colored resin material in dry-film form onto the substrate. By providing a color filter to the ASM-mode liquid crystal display device, a colored liquid crystal display device having a wide viewing angle characteristic could be obtained.

However, the ASM-mode liquid crystal display device and the method for manufacturing the same according to the above-mentioned prior art example 1 have the following problems. That is, according to the prior art liquid crystal display device, there is a need to form a separate polymer wall in order to axially symmetrically align the liquid crystal molecules. The existence of such polymer wall increases the resist existing when injecting the liquid crystal material, and as a result, increases the injection time greatly. Therefore, in order to reduce the resist during liquid crystal material injection, the height of the polymer wall is minimized. However, in such case, the height of the pillar-like protrusion made of resin material formed to define the thickness of the cell has to be relatively increased. Especially, when manufacturing a large-scale liquid crystal display device, it is difficult to form pillar-like protrusions made of a thick-film resin having the same height throughout the whole area of the large-sized substrate. As a result, the thickness of the cell becomes uneven within the display region of the liquid crystal display device, which causes unevenness of the brightness, the color, and the viewing angle characteristic of the display, deteriorating the display quality.

SUMMARY OF THE INVENTION

The present invention aims at solving the problems of the conventional method and device. The object of the present invention is to provide a liquid crystal display device having improved display quality and wide viewing angle characteristic, capable of preventing unevenness of cell gap within the display region, and reducing problems caused by such uneven cell gap, such as uneven brightness, color and viewing angle characteristic.

The present invention provides a liquid crystal display device comprising a pair of substrates, and a liquid crystal layer formed between said pair of substrates: wherein one of said pair of substrates is equipped with a first polymer spacer, and a second polymer spacer having portions overlapping the first polymer spacer, with pillar-like protrusions formed on the overlapping portions of said second polymer spacer.

Further, the present invention provides a liquid crystal display device, wherein the first polymer spacer is stripe-shaped.

Further, the present invention provides a liquid crystal display device, wherein the second polymer spacer is formed of transparent resin.

Moreover, the present invention provides a liquid crystal display device, wherein the second polymer spacer is stripe-shaped.

The present invention provides a liquid crystal display device, wherein the second polymer spacer is positioned substantially orthogonal to the first polymer spacer.

The present invention provides a liquid crystal display device, wherein the second polymer spacer is lattice-shaped.

Further, the present invention provides a liquid crystal display device, wherein the height of the second polymer spacer is either equal to or greater than the height of the first polymer spacer.

Moreover, the present invention provides a liquid crystal display device, wherein the thickness of the liquid crystal layer is defined by the sum of the height of the first polymer spacer, the height of the second polymer spacer, and the height of the pillar-like protrusion.

The present invention provides a liquid crystal display device, wherein the first polymer spacer consists of the laminated portion of a shading layer and a colored layer partially overlapping said shading layer.

Even further, the present invention provides a liquid crystal display device, wherein the first polymer spacer and the second polymer spacer divides the liquid crystal layer into plural liquid crystal regions, and axially symmetrically align liquid crystal molecules within each liquid crystal region.

The operation of the liquid crystal display device according to the present invention will now be explained. In the case where the liquid-state photosensitive resin material is applied on the substrate, uneven film thickness is caused mainly by two reasons. One cause is related to the method for applying the resin material. For example, according to the spin-coating method, uneven film thickness is generated either radially or concentrically. The other cause of uneven thickness is related to the resin material itself, such as the surface tension of the resin material, or the uneven volatility of the solvent. This type of unevenness does not depend on the application method, and the shape of the unevenness is similar (scally, for example).

After minimizing the uneven film thickness caused by the application method by controlling the condition of application and the like, the uneven film thickness caused by the material itself (the second cause of unevenness) becomes elicit.

The unevenness of film thickness becomes more obvious as the thickness of the formed film becomes greater. Especially, when using the photosensitive resin material as the spacer for determining the liquid crystal cell gap, the unevenness of the film thickness is the main cause that deteriorates display quality. In order to obtain a good display quality, it is necessary to reduce the unevenness of the film thickness as much as possible.

Especially, in a large-scale liquid crystal display device, not only the unevenness of display having a large pitch caused by the difference between the maximum value and the minimum value of the film thickness that effects the whole display surface, but also the unevenness of display caused by fine unevenness of film thickness that is generated by a finer pitch (with a distance of approximately few pixel elements to a few hundred pixel elements) is also noticeably observed. The display unevenness having a large pitch is mainly caused by the unevenness of film thickness caused by the application method, and the unevenness of film thickness with a finer pitch is often caused by the material itself.

It is discovered that in order to effectively reduce the unevenness of film thickness with a finer pitch caused by the material, the resin material should be applied by multiple layers through plural steps instead of applying all the material at once, and to form a resin material having a desired thickness by the multilayers. When the material is applied through a number of steps, the film thickness to be formed in a single step is reduced, and as a result, the unevenness of film thickness formed by a single step is also reduced. When utilizing a liquid-phase material, the unevenness of film thickness is not simply added according to the number of layers being laminated. Therefore, the unevenness of film thickness when the multiple layers finally reach the desired thickness is much smaller than when the material is applied all at once. This is because each layer of film applied on top of the other layer of film acts to fill up the unevenness of the layer formed beneath. Actually, in case the unevenness caused by applying the film to a certain thickness is ±5% the film thickness, the unevenness of film thickness having a thickness of 6 $\mu$m is ±0.3 $\mu$m. However, when the film is applied through three steps to form the same thickness, each step applying the film to a thickness of 2 $\mu$m, then only the unevenness caused by the final layer having a thickness of 2 $\mu$m is observed, and the unevenness of the film becomes approximately ±0.1 $\mu$m.

Therefore, by forming the spacer defining the cell gap by multiple layers, the unevenness of film thickness is reduced, and as a result, the display quality is improved.

However, according to the method of applying the material through plural steps without performing a patterning step each time to the layer, and instead, performing the patterning after all the layers are formed, it is discovered that the material applied in multiple layers effect each other, and the unevenness of the layer thickness is not sufficiently reduced. In other words, when the second layer is applied on top of the first layer that has been applied and pre-baked, the solvent included in the material of the second layer affects the material of the first layer, and creates an even larger unevenness of film thickness.

Therefore, in order to form a multi-layer film pattern, it is necessary to perform patterning and post-baking to every layer, so that the solvent included in the next layer does not affect the layer underneath.

In order to apply the above method to the conventional spacer or pillar-like protrusion defining the cell gap of the prior art ASM-mode liquid crystal display, it is necessary to divide the step for forming the pillar-like protrusion into multiple steps. In order to do so, the steps for applying and patterning the material is increased according to the number of the multiple layers, and this increases the manufacturing cost as a result.

The present invention aims at reducing the unevenness of film thickness without increasing the number of steps involved in manufacturing the film. Therefore, according to the present invention, the pillar-like protrusions are formed on the crossing points of the step-shaped structure formed to the color filter and the transparent structure for axially symmetrically aligning the liquid crystal molecules. By applying such structure, the present invention provides a liquid crystal display having an even cell gap, the effect of which is equal to forming the spacer defining the cell gap through multiple steps. Accordingly, the present invention provides a liquid crystal display including a multi-layered spacer defining the cell gap, without increasing the number of manufacturing steps compared to the conventional ASM-mode liquid crystal display device. As a result, the present invention realizes a liquid crystal display having a good display quality with reduced cell gap.

DETAILED DESCRIPTION OF PREFERRED EMBODIMENTS

The preferred embodiment of the present invention will now be explained.

Figure 1:
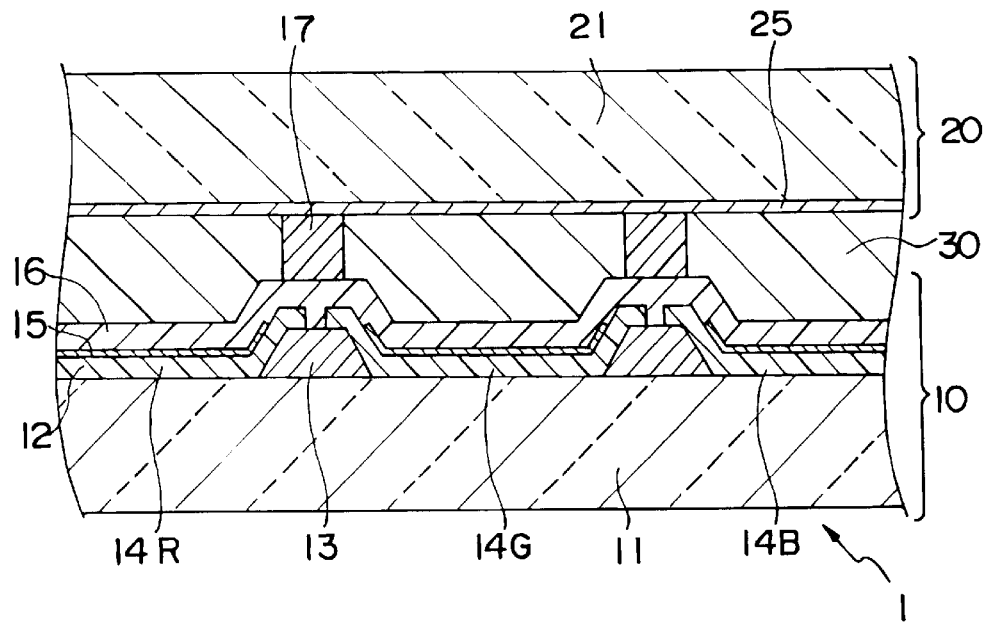
FIG. 1 is a cross-sectional view showing the liquid crystal display device according to embodiment 1.
Figure 2:
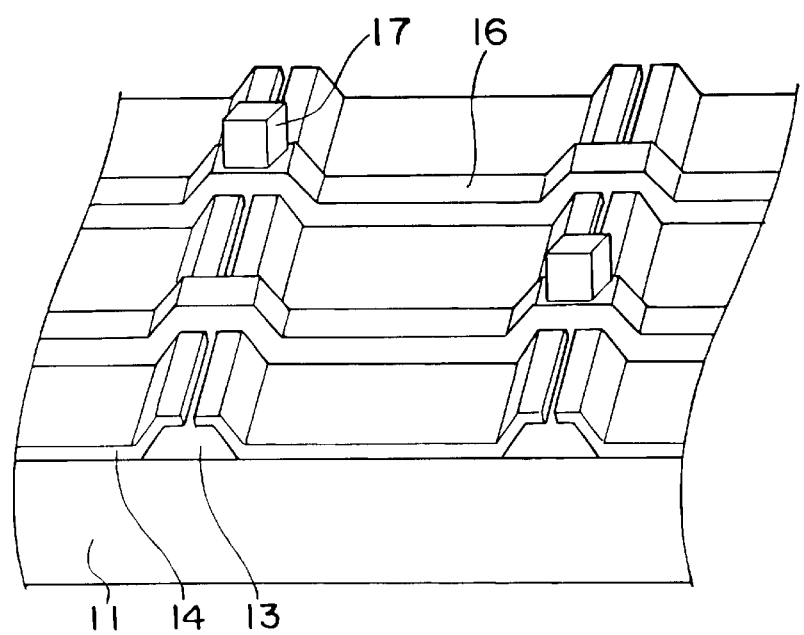
FIG. 2 is a perspective view showing the first substrate side of the liquid crystal display device according to embodiment 1.
Figure 3:
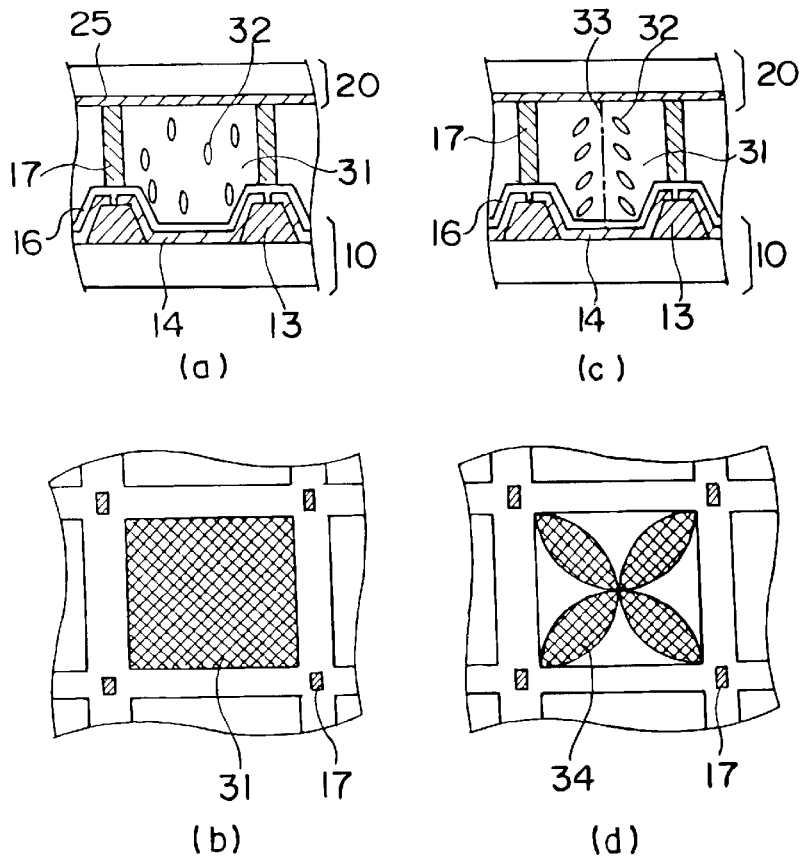
FIGS. 3(a)–3(d) are explanatory view showing the operation of the ASM-mode liquid crystal display device.
Figure 4:
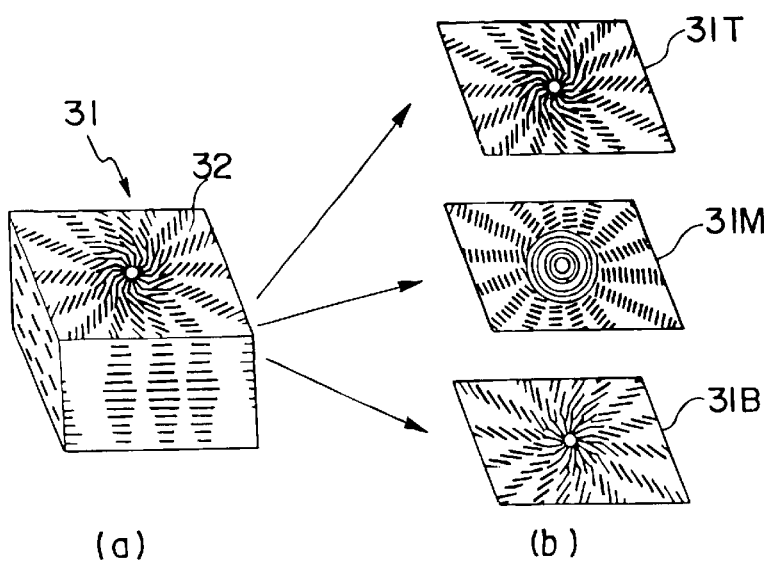
FIGS. 4(a)–4(b) are explanatory view showing the axially symmetrically aligned liquid crystal molecules within the liquid crystal region.
Figure 5:
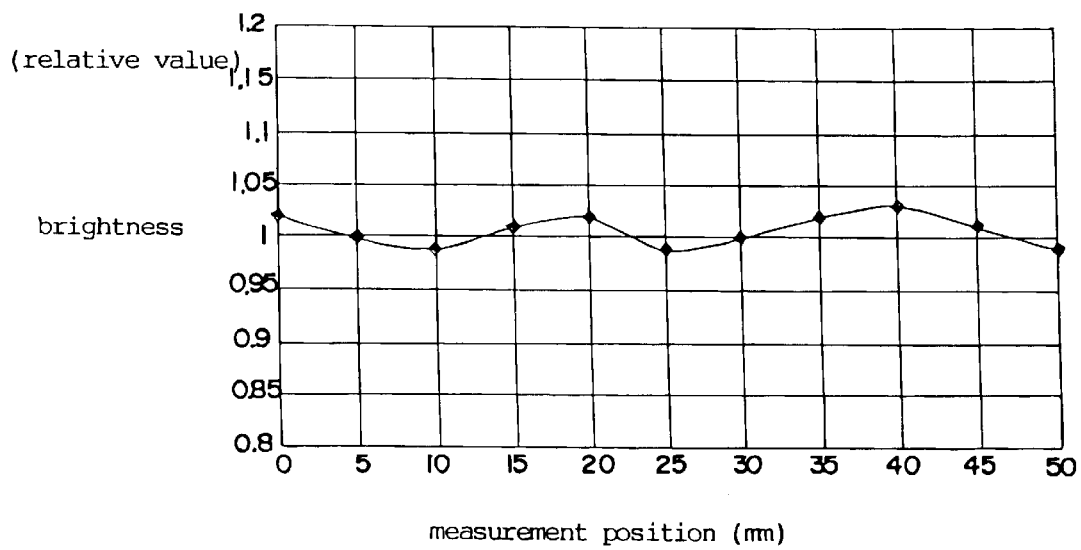
FIG. 5 is an explanatory graph showing the data related to the unevenness of brightness according to the liquid crystal display device of embodiment 1.
Figure 7:
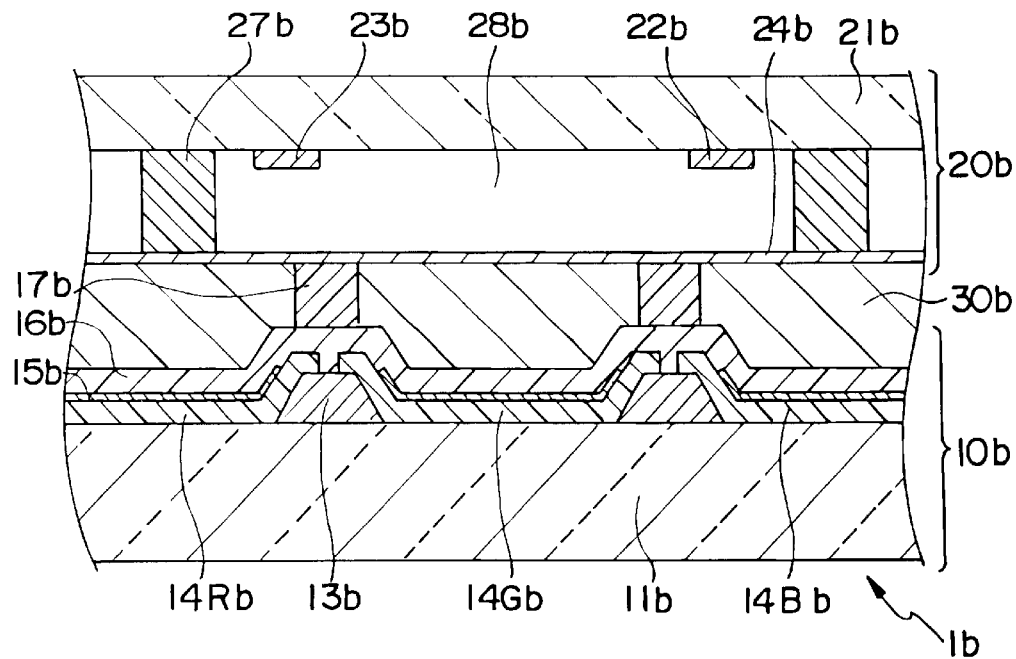
FIG. 7 is a cross-sectional view showing the liquid crystal display device of embodiment 2.
Figure 8:
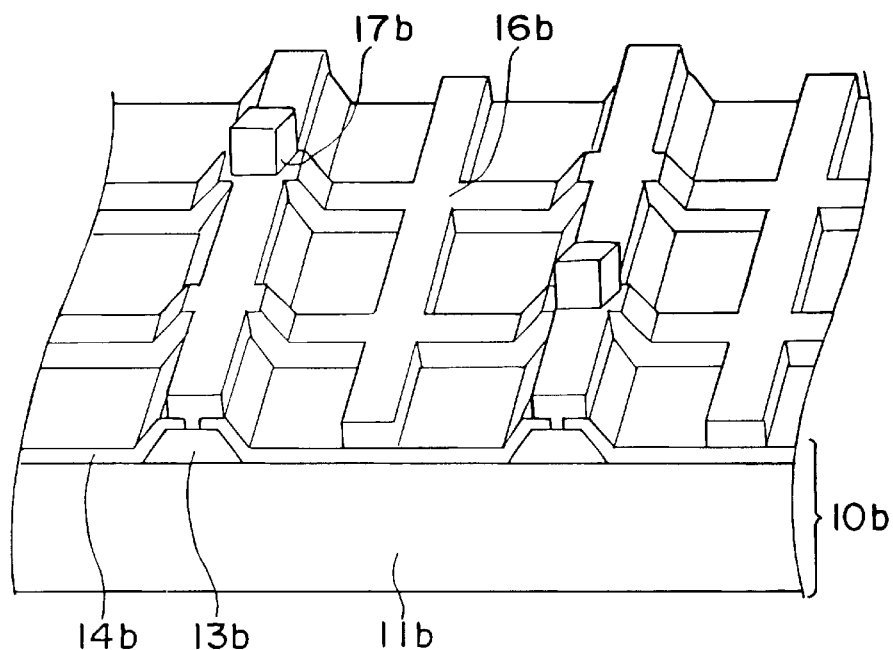
FIG. 8 is an explanatory perspective view showing the first substrate side of the liquid crystal display device of embodiment 2.
Figure 9:
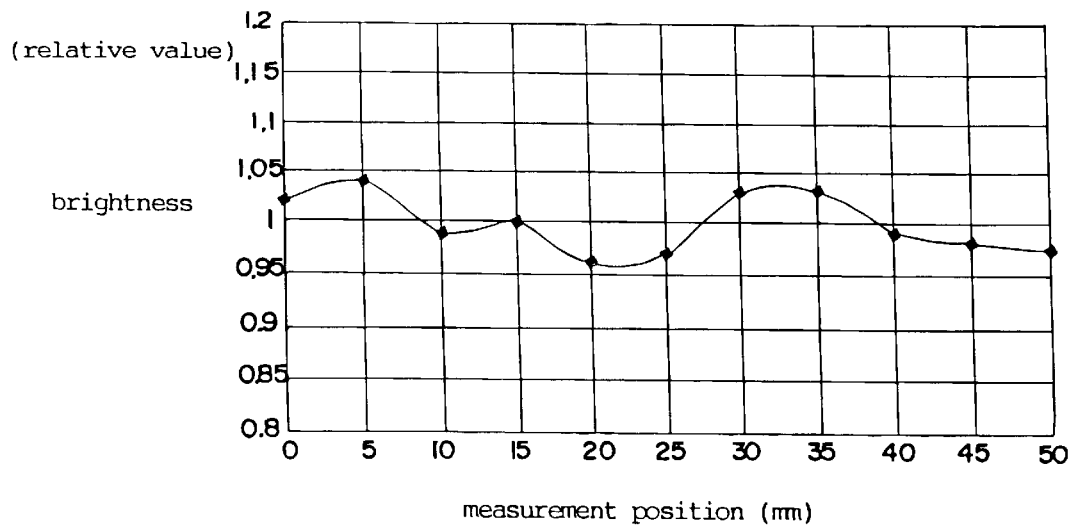
FIG. 9 is an explanatory graph showing the data related to the unevenness of brightness according to the liquid crystal display device of embodiment 2.
Figure 10:
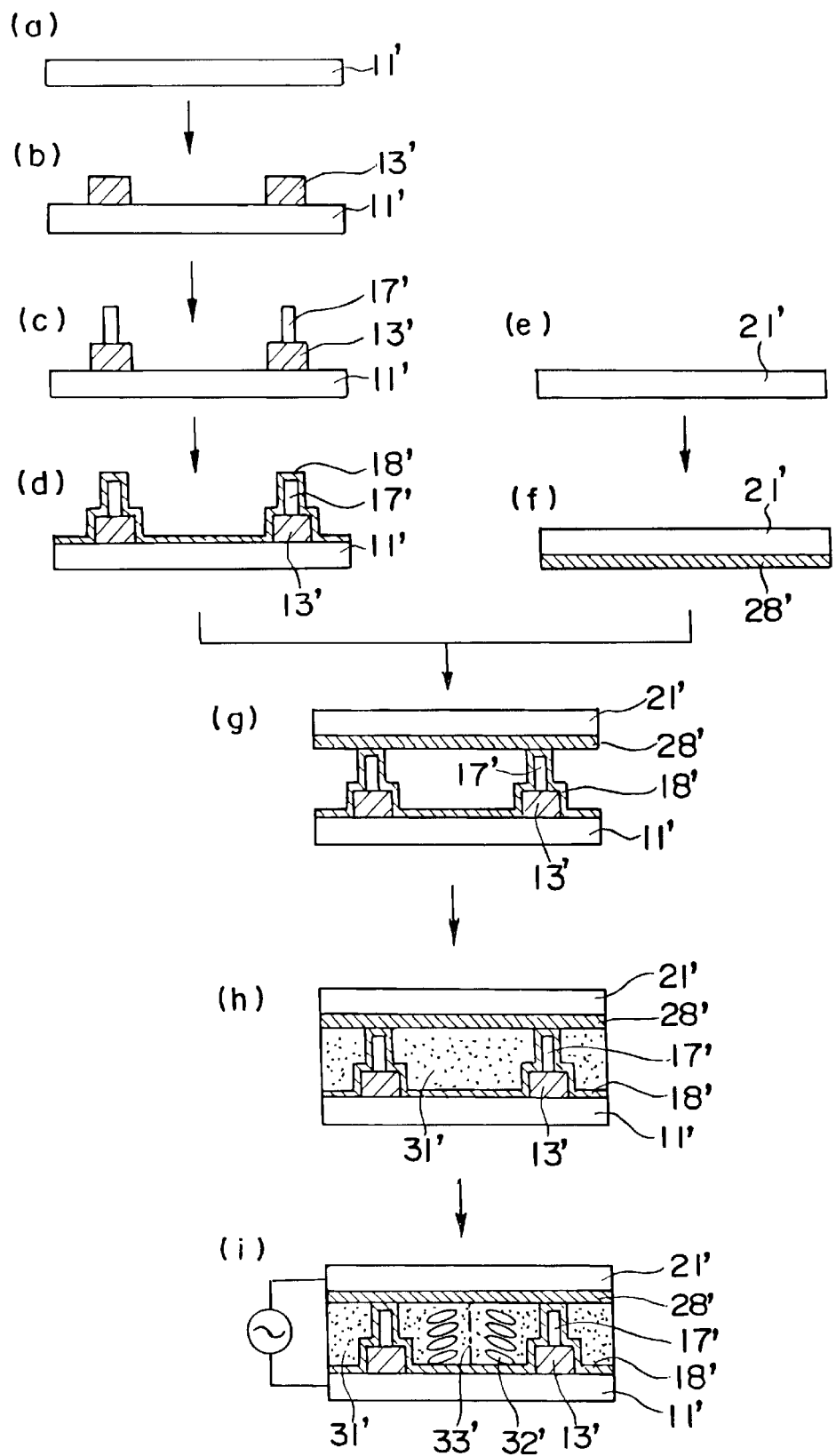
FIGS. 10(a)–10(i) are explanatory views showing the method for manufacturing the ASM-mode liquid crystal display device according to the prior art.
Figure 11:
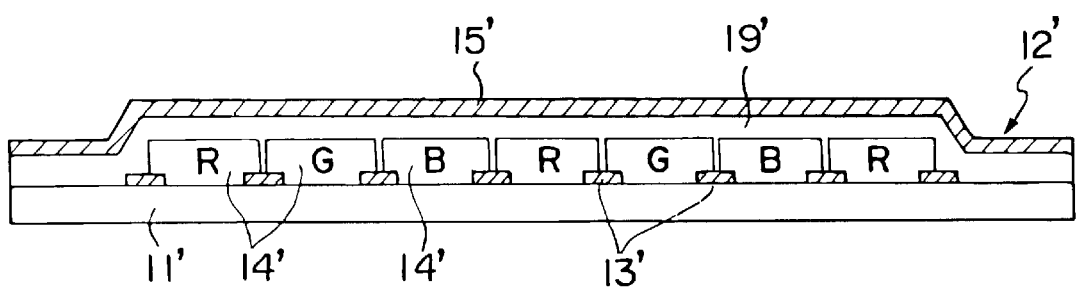
FIG. 11 is an explanatory cross-sectional view showing the color filter substrate according to the prior art.

The embodiment of the liquid crystal display device according to the present embodiment will be explained with reference to FIGS. 1 through 5 and FIGS. 7 through 9. FIG. 1 is a cross-sectional view showing the liquid crystal display device according to embodiment 1. FIG. 2 is a perspective view showing the side of the first substrate according to the liquid crystal display of embodiment 1. FIG. 3 is an explanatory view showing the operation of the ASM-mode liquid crystal display device. FIG. 4 is a diagram showing the axially symmetrically aligned status of the liquid crystal molecules within the liquid crystal region. FIG. 5 is an explanatory graph showing the data related to the unevenness of brightness of the liquid crystal display device according to embodiment 1. FIG. 7 is a cross-sectional view showing the liquid crystal display device of embodiment 2. FIG. 8 is a perspective explanatory view showing the first substrate side of the liquid crystal display device according to embodiment 2. FIG. 9 is an explanatory graph showing the data related to the unevenness of brightness of the liquid crystal display device according to embodiment 2.

Embodiment 1 will now be explained. The cross-sectional structure of a liquid crystal display device 1 according to the present embodiment is shown in FIG. 1. The display device 1 comprises a first substrate 10, a second substrate 20, and a liquid crystal layer 30 formed between the first substrate 10 and the second substrate 20. The first substrate 10 is equipped with a color filter 12 formed of a shading layer 13, a colored layer 14 and the like. On the first substrate 10 is formed a transparent structure 16 and pillar-like protrusions 17. The liquid crystal layer 30 comprises liquid crystal molecules (not shown) having negative dielectric anisotropy. The example of the present invention utilizing a liquid crystal material having negative dielectric anisotropy and a vertical alignment film is shown in embodiment 1. However, the present invention is not limited to such example.

The first substrate 10 comprises a transparent substrate 11 such as a glass substrate, a color filter 12 formed on the transparent substrate 11 including a stripe-shaped black matrix (BM) 13 and colored resin layers 14R, 14G and 14B colored to red, green and blue, a transparent electrode 15 made of ITO formed on the color filter, and a transparent structure 16 formed of transparent resin. The thickness of BM 13 is 1.2 $\mu$m, the width is 40 $\mu$m, and the distance between adjacent BM are 162 $\mu$m. The thickness of each colored resin layer 14R, 14G and 14B are each 1.2 $\mu$m, and the width is 190 $\mu$m. Accordingly, the region in which the BM 13 is overlapped by the colored resin layers 14R, 14G or 14B, respectively, is 14 $\mu$m on one side. The height of the step structure formed to the overlapped portion is 1.2 $\mu$m. The height of the transparent structure 16 is 1.5 $\mu$m, and the width is 30 $\mu$m. The transparent structure 16 is arranged in stripes in the direction substantially orthogonal to BM 13, and the spacing between the stripes is 100 $\mu$m. The area where the BM 13 and respective colored resin layers 14R, 14G and 14B overlap is defined as a first polymer spacer body, and the transparent structure 16 is a second polymer spacer body.

Pillar-like protrusions 17 are selectively formed on some of the crossing points of BM 13 and the transparent structure 16, as shown in FIG. 2. On the surface of the first substrate 10 facing the liquid crystal layer 30 is formed a vertical alignment film for aligning the liquid crystal molecules (not shown) in the liquid crystal layer 30, which is arranged to cover at least the transparent electrode 15 and the transparent structure 16 (not shown). The pillar-like protrusion 17 is not necessarily formed on all the crossing points of BM 13 and the transparent structure 16, but it may be formed with appropriate density on some of the crossing points in order to provide sufficient strength.

The second substrate 20 is formed as follows on the surface of a transparent substrate (such as glass substrate) 21 facing the liquid crystal layer 30, a second transparent electrode 25 made for example of ITO is formed. Moreover, a vertical alignment film is formed to cover the second transparent electrode 25 (not shown).

A known electrode structure and driving method could be applied for designing and driving the first electrode 10 and the second electrode 20, which drive the liquid crystal layer 30. For example, an active matrix type, a simple matrix type, or a plasma address type may be applied. According to the applied electrode structure and driving method, the position of the first substrate 10 and that of the second electrode 20 may be exchanged.

FIGS. 3(a) through (d) are referred to in operating the liquid crystal display 1 of embodiment 1. In the state where no voltage is applied to the liquid crystal region 31, as shown in FIG. 3(a), the liquid crystal molecules 32 are aligned vertically to the substrate surface by the alignment regulating force provided by the vertical alignment film (not shown) formed on the surfaces of the pair of substrates 10 and 20 facing the liquid crystal layer 30. When such state is observed by a polarizing microscope in crossed-Nicols state, as shown in FIG. 3(b), dark-filed is observed (normally-black mode). When voltage corresponding to gray-scale display is applied to the liquid crystal region 31, force is provided which aligns the liquid crystal molecules 32 having negative dielectric anisotropy so that their longitudinal axes are positioned vertical to the direction of the electric field. Therefore, as shown in FIG. 3(c), the liquid crystal molecules are tilted from the direction vertical to the substrates (gray-scale display mode). At this time, by the operation of the overlapped portion of the stripe-shaped BM 13 overlapped by the colored resin layers 14R, 14G and 14B and the orthogonally arranged stripe-shaped transparent structure 16, the liquid crystal molecules 32 within the liquid crystal region 31 is axially symmetrically aligned with its center placed at the center axis 33 shown by the broken line in the drawing. When observing such state through the polarizing microscope in crossed-Nicols state, as shown in FIG. 3(d), a quenching pattern 34 is observed in the direction along the polarizing axis.

In the present specification, axially symmetrical alignment includes tangential and radial alignments. Moreover, the alignment further includes spiral alignment as shown in FIG. 4. The spiral alignment is obtained by adding a chiral agent to the liquid crystal material, so as to provide a twisted alignment force thereto. The liquid crystal molecules are spirally aligned at the upper portion 31T and the lower portion 31B of the liquid crystal region 31, and near the middle area 31M, the molecules are aligned tangentially, as shown in FIG. 4(b). The liquid crystal molecules are aligned in a twisted manner to the direction of thickness of the liquid crystal layer. Generally, the direction of the center axis of the axially asymmetrically aligned molecules substantially matches the normal direction of the substrate.

The axially symmetrical alignment of the liquid crystal molecules improves the viewing angle characteristic of the display. When the liquid crystal molecules are axially symmetrically aligned, the refractive index anisotropy of the liquid crystal molecule is averaged at all azimuth directions. Therefore, the display is free from problems observed in the conventional TN mode liquid crystal displays, in which the viewing angle dependency differs greatly according to the azimuth direction. Moreover, by using a liquid crystal material having a positive dielectric anisotropy and a horizontal orientation film, axially symmetrical alignment can also be obtained while no voltage is applied to the display. When the liquid crystal molecules are axially symmetrically aligned at least when voltage is applied to the display, then wide viewing angle characteristics can be obtained.

The method for manufacturing the liquid crystal display 1 according to the present embodiment will now be explained in detail. A photosensitive black-colored resin (v259-BKIS manufactured by Shin-Nihon Seitetsu K. K.) is applied onto the transparent substrate 11 made for example of glass by a spin coating method. A mask having a predetermined striped-pattern is used to form the black matrix (BM) 13 through a photolithography method. A product called V259-ID manufactured by Shin-Nihon Seitetsu K. K. is utilized as the developing agent. The thickness of the BM 13 after baking (post-baking) is designed to be 1.2 $\mu$m. After forming the BM 13, the stripe-shaped colored resin layers 14R, 14G and 14B are formed. As the material for the colored resin layers, products called CR-7001 (red), CGY-S601C (green), and CBV-602C (blue) manufactured by Fuji Film Olin is used. The thickness of the colored resin layer is also designed to be 1.2 $\mu$m after baking. Moreover, both ends on the shorter side of the stripe-shaped colored resin layers are positioned to overlap the BM 13. As a result, stripe-shaped step structures are formed. The height of the steps is 1.2 $\mu$m.

Thereafter, an ITO film having a thickness of 150 nm is applied on the whole surface of the transparent substrate 11 by a sputtering method. Patterning is performed to the ITO film, thereby forming a transparent electrode 15. A photosensitive acrylic resin (CSP-S002 manufactured by Fuji Film Olin) is applied thereto by a spin-coating method, and photolithography method using a predetermined striped-pattern mask is provided thereto in order to form the transparent structure 16. The height of the transparent structure 16 is set to 1.5 $\mu$m. After forming the transparent structure 16, pillar-like protrusions 17 are formed on some of the crossing points of BM 13 and the transparent structure 16 by a photolithography method using a photosensitive acrylic resin (CSP-S002 manufactured by Fuji Film Olin), with its height set to 3.3 $\mu$m. A CD manufactured by Fuji Film Olin is used as the developing agent for the colored resin layers 14R, 14G and 14B, the transparent structure 16, and the pillar-like protrusions 17. An orientation film material JALS-204 (made of polyimide resin: manufactured by JSR) is spin-coated onto the whole surface of the substrate to form a vertical alignment film (not shown), and thereby, the first substrate 10 is completed.

On the other hand, the second substrate 20 is manufactured by forming an ITO film on the transparent substrate 21 made for example by glass, patterning the ITO film in order to obtain a second transparent electrode 25 having a thickness of 150 nm, and spin-coating JALS-204 (manufactured by JSR) on the whole surface in order to form a vertical alignment film (not shown).

The first substrate 10 and the second substrate 20 are then bonded together. The thickness of the cell is defined by the sum of the following the height of the step structure 1.2 $\mu$m formed by the overlapped portions of BM 13 and colored resin layers 14R, 14G or 14B; the thickness 1.5 $\mu$m of the transparent structure 16; and the height 3.3 $\mu$m of the pillar-like protrusion. According to the present embodiment, the cell gap is 6.0 μm. A liquid crystal layer 30 is formed by injecting to the gap formed between the bonded first and second substrates 10, 20 liquid crystal material having negative dielectric anisotropy, such as an n-type liquid crystal material which includes a chiral agent that provides a 90-degree twist to the liquid crystal when $\Delta\epsilon=-4.0$, $\Delta n=0.08$ and the cell gap is 6.0 μm. Thereby, the liquid crystal cell is completed.

In order to stabilize the center axis of the axially symmetrical alignment of the liquid crystal molecules within the liquid crystal cell, a voltage of 4.0 V is applied to the liquid crystal layer 30. A plural number of center axes are formed at the initial stage directly after applying the voltage. However, after continuous voltage application, the plural center axes within each liquid crystal region 31 become one axis, and a single axially asymmetrically aligned region (mono-domain) is formed. The liquid crystal display device 1 is completed by arranging polarizing plates on both sides of the liquid crystal cell in crossed-Nicols relation.

Figure 6:
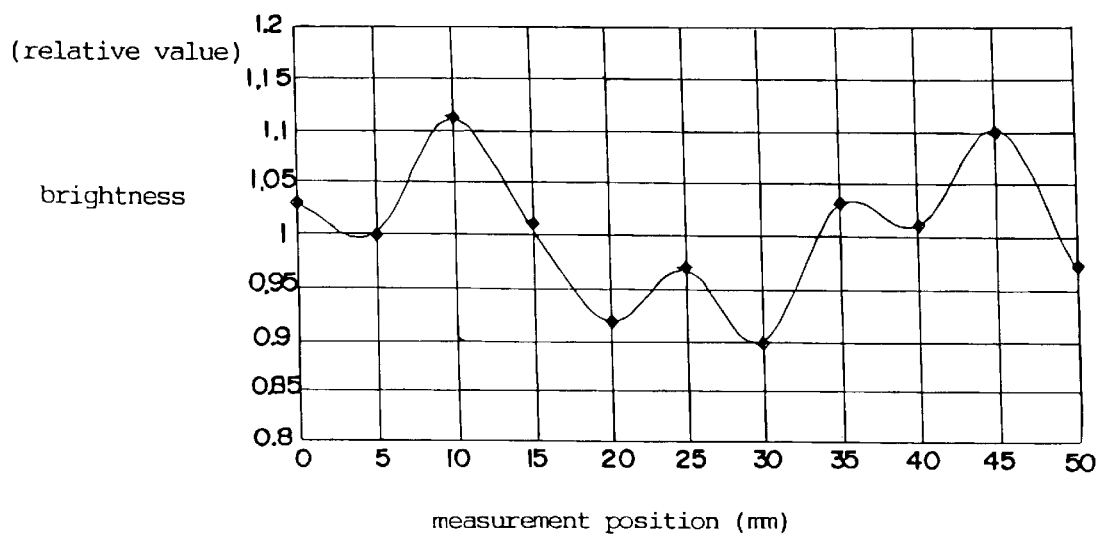
FIG. 6 is an explanatory graph showing the data related to the unevenness of brightness according to the liquid crystal display device of the prior art.

FIG. 5 is a graph showing the measurement result of the brightness distribution when displaying gray-scale on the liquid crystal display 1 manufactured as explained above. The horizontal axis shows the measurement position (mm), and the vertical axis shows the brightness (relative value). The manufactured liquid crystal display 1 is a large-sized panel having a diagonal size of 42 inches. FIG. 5 shows the distribution of the uneven brightness of one area of the display surface on the panel. A comparison example is shown in FIG. 6 as graph 2, in which the brightness distribution according to a prior art panel measured according to the same method as FIG. 5 is shown. FIGS. 5 and 6 are compared. According to the prior art liquid crystal display device, the unevenness of brightness is observed by few to few dozen-millimeter pitches, and the degree of unevenness of the brightness is approximately ±10%. Such unevenness of brightness is generated by the uneven film thickness, which is caused by the material itself defining the thickness of the cell. In comparison, according to the liquid crystal display device 1 of the present embodiment, the degree of unevenness of brightness is reduced to approximately ±3%. A remarkable improvement of the display quality is recognized. In other words, the result of comparison of the brightness between the prior art device and the present device proves that according to the liquid crystal display device 1 of the present embodiment, the unevenness of cell gap is reduced greatly compared to the prior art display device.

Embodiment 2 will now be explained. FIGS. 7 and 8 show the cross-sectional view of a liquid crystal display device 1b according to embodiment 2. Moreover, FIG. 8 is an explanatory perspective view of a first substrate 10b side of the liquid crystal display device 1b according to embodiment 2. In embodiment 2, the second substrate 20b of the liquid crystal display device 1b is provided with a plasma address-type switching function. Further, the transparent structure 16b of the first substrate 1b is lattice-shaped. The second substrate 20b comprises a transparent substrate 21b, an anode 22b, a cathode 23b, a dielectric sheet 24b, a rib 27b, a plasma discharge channel 28b, and so on. The other structures are the same as embodiment 1.

Since the transparent structure 16b has a lattice-shaped pattern, the structure 16b exists above the overlapped portions of the BM 13b and the colored resin layers 14Rb, 14Gb and 14Bb. Therefore, even when the position of the pillar-like protrusion 17b is receded along the direction of stripe of the BM 13b, it will not cause unevenness of cell gap, and therefore, will not cause deterioration of the display properties.

When the liquid crystal display utilizes a plasma address-type switch, voltage is applied to the liquid crystal layer 30b according to the capacity partition between a dielectric sheet 24b. Therefore, if the thickness of the liquid crystal layer 30b is increased, the voltage applied to the liquid crystal layer 30b is also increased, and if the thickness is decreased, the applied voltage is also reduced. Therefore, compared to the conventional liquid crystal display, the unevenness of brightness of the display caused by the unevenness of cell gap is more severely observed according to the plasma address-type liquid crystal display device.

However, as shown in FIG. 9, the level of unevenness of the brightness according to the liquid crystal display device of embodiment 2 proved to be good, within a range of ±5%, and no unevenness was observed on the display.

The "second polymer spacer" utilized in the present embodiment should preferably be formed of a transparent material. In such case, the switching of the liquid crystal molecules existing above the second polymer spacer contributes to the display when voltage is applied thereto, and as a result, the brightness of the display is improved. The height of the second polymer spacer should be equal to or greater than the height of the "first polymer spacer", and approximately half or smaller than half of the thickness of the liquid crystal layer. If the height is too small, the alignment regulation force provided to the liquid crystal molecules becomes too small. However, if the height is too high, the resistance when injecting liquid crystal to the cells becomes too high, and the level of light absorption can no longer be ignored, even when the spacer is formed by transparent material. The actual height should approximately be 1–3 μm. As for the width, it is preferable to minimize the width from the point of view of light absorption, but considering the fact that a pillar-like protrusion is to be formed on the second polymer spacer, the width should preferably be approximately 10–50 μm. The interval should be less than approximately 150 μm, in order to prevent the weakening of alignment regulating force provided to the liquid crystal molecules.

As mentioned, according to the present invention, the structure of the spacer for defining the cell gap could be formed as a multilayer, without having to increase the number of manufacturing steps. According to such spacer structure, the uniformity of cell gap of the liquid crystal display is improved, and the unevenness of brightness, color and viewing angle characteristics is reduced greatly, realizing a liquid crystal display having an advantageous display quality. Moreover, according to the present structure of the display device, the accuracy required for positioning the pillar-like protrusions is modified, and the evenness of the cell gap is improved, resulting in the increase of manufacture margin. Even further, the present invention defines the thickness of the transparent structure for axially symmetrically aligning the liquid crystal molecules effectively, in order to provide a liquid crystal display device having a wide viewing angle characteristic.

We claim:

1. A liquid crystal display device comprising;
   a pair of substrates, and a liquid crystal layer provided between said pair of substrates;
   at least one first stripe-shaped polymer spacer aligned in an x direction;
   a stripe-shaped portion of at least one second polymer spacer aligned in a y direction orthogonal to the x direction, so that a crossing area where the second polymer spacer crosses over the first stripe-shaped polymer spacer is defined as an area of overlap, the second polymer spacer being either stripe shaped or lattice-shaped;

a pillar-like protrusion formed on the area of overlap in order to help space the substrates from one another.

2. The liquid crystal display device according to claim 1, wherein said second polymer spacer is formed of transparent resin.

3. The liquid crystal display device according to claim 1 wherein said second polymer spacer is stripe-shaped.

4. The liquid crystal display device according to claim 1, wherein said second polymer spacer is lattice-shaped.

5. The liquid crystal display device according to claim 1, wherein the height of said second polymer spacer is either equal to or greater than the height of said first polymer spacer.

6. The liquid crystal display device according to claim 1, wherein said first polymer spacer consists of the portion of a shading layer overlapped by a colored layer, and the portion of said colored layer overlapping said shading layer.

7. The liquid crystal display device according to claim 1, wherein said first polymer spacer and said second polymer spacer divides said liquid crystal layer into plural liquid crystal regions, and axially symmetrically align liquid crystal molecules within each liquid crystal region.

8. The display device of claim 1, wherein the first spacer comprises at least a portion of a black matrix layer overlapped by a portion of a color filter.

9. The display device of claim 1, where the display includes said first polymer spacer, and wherein the pillar like protrusions are formed over some of the areas of overlap where the second polymer spacer overlaps the first polymer spacer.

10. A liquid crystal display comprising:

a liquid crystal layer provided between first and second substrates;

a plurality of parallel first polymer spacers each aligned in a first direction;

second polymer spacers having at least a portion thereof aligned in a second direction orthogonal to the first direction so as to define areas of overlap where the second polymer spacer crosses at least some of the first polymer spacers; and pillar-like protrusions formed over at least some of the areas of overlap in order to help space the substrates from one another.

11. The display of claim 10, wherein the second polymer spacer is one of:

(a) stripe-shaped, and (b) lattice shaped.

12. The display of claim 10, wherein the first polymer spacers are stripe-shaped.

13. (New) The display of claim 10, wherein the first polymer spacers each comprise at least a portion of a black matrix layer overlapped by a portion of a color filter layer.

* * * * *